May 4, 1943.   A. Y. DODGE   2,318,471
FRICTION TOROIDAL TRANSMISSION
Filed May 7, 1941   2 Sheets-Sheet 1

INVENTOR
ADIEL Y. DODGE
BY Dawson, Ooms & Booth
ATTORNEYS

May 4, 1943. A. Y. DODGE 2,318,471
FRICTION TOROIDAL TRANSMISSION
Filed May 7, 1941 2 Sheets-Sheet 2

INVENTOR
ADIEL Y. DODGE
BY Dawson, Ooms & Booth
ATTORNEYS

Patented May 4, 1943

2,318,471

UNITED STATES PATENT OFFICE 2,318,471

FRICTION TOROIDAL TRANSMISSION

Adiel Y. Dodge, Rockford, Ill.

Application May 7, 1941, Serial No. 392,199

5 Claims. (Cl. 74—200)

This invention relates to transmissions and more particularly to relatively small inexpensive transmissions of the friction toroidal type providing a wide variation in speed and torque ratios.

All of the transmissions heretofore proposed which are capable of a wide range of speed and torque ratios have been relatively expensive and complicated. Such transmissions, due to their cost, have been unable to supply the demand in many fields, as for example, for driving small power tools whose requirements vary from a fraction of a horsepower to several horsepower. It is accordingly one of the objects of the present invention to provide a transmission having a wide range of speed and torque ratios, which is simple and inexpensive to manufacture.

Another object of the invention is to provide a transmission formed largely of sheet metal such as sheet metal stampings or pressings. One of the important features of the invention is to provide a transmission having a minimum number of different parts, thereby simplifying the tools and dies required for production of the transmission, and reducing its cost.

Still another object of the invention is to provide a transmission of the friction type in which the traction pressure is varied in accordance with the load and the angle of the driving rollers. This is accomplished in the present invention without the use of specially shaped rollers or discs and with a simple cam mechanism.

Still another object of the invention is to provide a transmission of the friction type in which the angle of the rollers is adjustable through a simple worm mechanism. According to one feature, the relative adjustment of the rollers may be varied by shifting the worm lengthwise.

The above and other objects, advantages and novel features of the invention will be apparent from the following description when read in connection with the accompanying drawings, in which.

Figure 1:
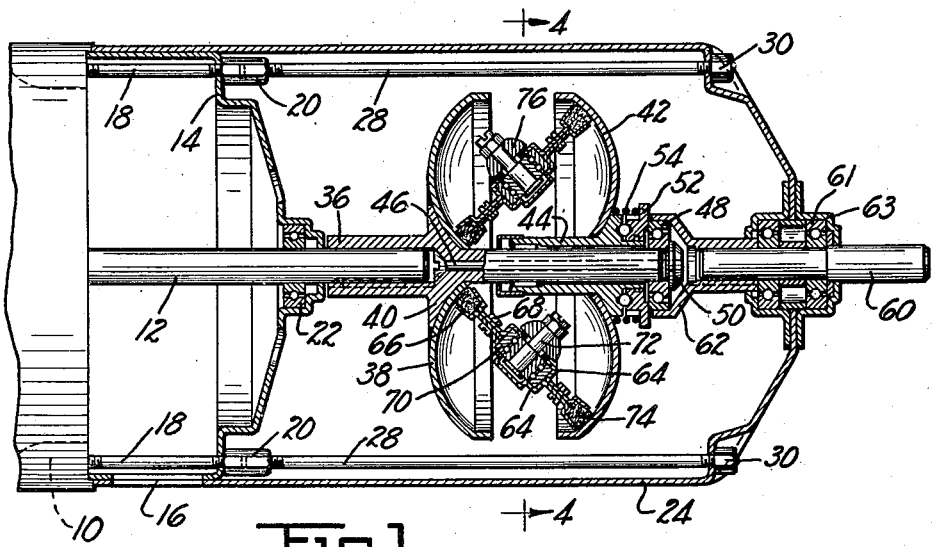
Figure 1 is an axial section through a transmission, embodying the invention.
Figure 2:
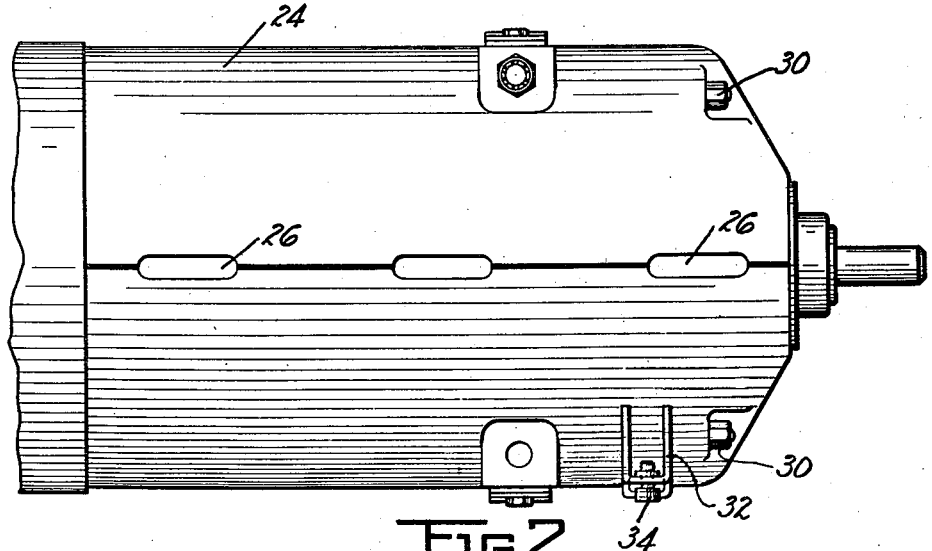
Figure 2 is a side elevation of the transmission of Figure 1.

The transmission of Figure 1 is adapted to be driven by an electric motor or the like, whose main frame is indicated generally at 10, and which has a driving shaft 12. The end of the motor frame is modified or replaced by a sheet metal closure 14 shaped to fit against the end of the frame 10 and formed with ventilating openings 16 in its side. Bolts 18, secured in place by elongated nuts 20 secure the closure 14 on the motor frame. The closure 14 carries a bearing 22 rotatably supporting the shaft 12, the shaft projecting beyond the bearing.

The transmission unit is adapted to be directly connected to the end of the motor and is enclosed in a housing 24, formed of identical sheet metal stampings connected together face to face. At their meeting edges the stampings are formed with cut-out portions to provide ventilation openings 26, and are held in assembled position with the motor by bolts 28 connected at one end to the elongated nuts 20 and extending axially through the housing to receive nuts 30 on the exterior thereof.

The stampings forming the housing are preferably assembled in a jig or frame and are welded together at their meeting edges between the openings 26. Preferably the stampings are of a size such that the edges will be spaced when placed in the assembly jig so that inaccuracies will not interfere with proper assembly, the spaces being filled by welding.

The housing is adapted to be supported on a bench or table by a stamped sheet metal cradle 32 fastened to the lowermost housing part by welding or the like, and underlying the housing. The cradle rests on feet 34 formed by bolts extending therethrough and adapted to be adjusted vertically to vary their length. In this way, the motor and the housing may be supported rigidly on a bench or floor or the like.

The transmission mechanism comprises a driving shaft 36 keyed to the motor shaft 12 and terminating free of the outer end of the housing 24. A toroidal disc 38 stamped from sheet metal or otherwise formed from desired sheet material is rigidly secured to the driving shaft 36 by a hub 40 thereon. A similar disc 42, which is identical with the disc 38 except that its central opening is slightly larger, is similarly secured to a sleeve 44 rotatably and slidably on the driving shaft 36. Since these discs are substantially similar, they may be stamped or pressed in the same die and the disc 42 may thereafter have its center portion punched or drilled out to the required larger diameter.

The discs are held together by means of rotatable connections between the driving shaft 36 and the sleeve 44, such connections as shown comprising a bolt 46 extending through the driving shaft and supporting a thrust bearing 48 at the end thereof. The thrust bearing is interposed between a nut 50 on the end of the bolt 46 and a rotatable collar 52 mounted on the end of the sleeve 44. A spring 54 between the collar 52 and the disc 42 urges the disc 42 toward the disc 38.

Figure 3:
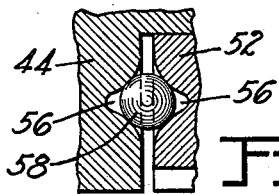
Figure 3 is an enlarged partial section of the loading cam mechanism of Figure 1.
Figure 4:
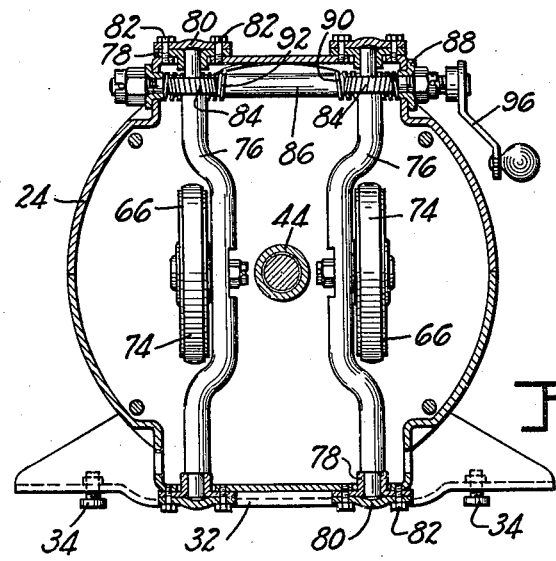
Figure 4 is a transverse section on the line 4—4 of Figure 1, with parts in elevation.

In order to urge the discs together with a greater force proportional to the imposed load, the collar 52 and the adjacent end surfaces of the disc 44 are formed as shown in Figure 3 with pockets 56 having flaring side walls. Bearing balls 58 are mounted to engage in these pockets, the pockets and bearing balls cooperating to form a cam mechanism tending to urge the sleeve 44 to the left in proportion to the torque load imposed on the collar 52. The collar 52 is connected to a driven shaft 60 by means of a sleeve 62 formed at its end with teeth which interengage with spaced lugs on the collar. The shaft 60 is rotatably supported on a bearing 61 which is in turn supported from the housing by means of cap shaped stampings 63 secured thereto. Thus the load imposed by the cam mechanism tending to urge the sleeve 44 to the left is proportional to the load on the driven shaft 60.

A pair of rollers are mounted between the discs 38 and 42 in frictional engagement with the toroidal surfaces of the discs. The rollers, as shown, are formed of sheet metal stampings 64 which are identical except that one has been punched out at its center while the other has not. The stampings are formed with offset central portions and with offset edge portions, as shown at 66, and are adapted to be assembled in face to face relationship by means of fastenings such as bolts 68. The offset central portions form housings for bearings 70, on which the rollers are rotatably supported on shafts 72, and the offset portions 66 support a tire or ring 74.

The tire or ring 74 is formed of an elastic material which is heat and oil resistant, sufficiently hard to transmit a relatively high load, and sufficiently pliable to run quietly over the disc surfaces regardless of minor imperfections therein and to have a high coefficient of friction. One material which I have found to be satisfactory is synthetic rubber, used alone or mixed with a smaller quantity of natural rubber. To this may be added if desired pieces of cork, cotton fabric, asbestos, or the like, or resins such as Bakelite. When properly treated, such compounds are harder than the rubber normally used in automobile tires, but are softer than the usual brake or clutch lining materials.

In making the tires 74, they are preferably molded to a diameter slightly smaller than the shoulder of the offset portions 66. This requires that the rings be stretched slightly during assembly and insures that they will seat tightly against the shoulders. It will be noted that when assembled, the rings are supported on three sides, thus controlling flow or distortion of the ring material and allowing a heavier load to be carried.

Since the rings are supported without fastenings extending therethrough, it is necessary that they be securely held to prevent them from creeping around the rollers. For this purpose, the sidewalls of the offset portions 66 are arranged at an angle to the plane of the ring whose tangent is less than the coefficient of friction between the ring and the sidewalls. In this way radial force on the ring wedges it against the sidewalls by wedging pressure and by distortion of the ring to create a gripping force greater than the tangential load on the ring, so that the ring is held against slipping or creeping.

In operation, the outer surface of the ring at the point of contact with the discs 38 and 42 will be deformed slightly, both tangentially and radially. However, as the roller turns, the ring will spring back to its original shape and the energy stored in it due to its deformation will be imparted to the discs. Thus relatively high torque loads can be transmitted with a high degree of efficiency. The toroidal surfaces of discs 38 and 42 are curved about centers spaced along a line parallel to the driving shaft axis and the rollers are mounted with their centers in alignment with the centers of the disc toroidal surfaces. As shown, the diameter of the rollers is greater than two times the radius of the toroidal surfaces of the discs for proper cooperation with the surfaces of the cam pockets 56, although it will be understood that the roller radius could be smaller than the radius of the toroidal surfaces, and the curvature of the pockets 56 could be reversed to accomplish the same results.

Due to this construction the rollers will spread the discs to a different extent in different angular positions of the rollers, thereby causing the sleeve 44 and disc 42 to move axially of the driving shaft as the angle of the discs is varied. This axial movement varies the distance between collar 52 and sleeve 44, thereby causing the balls 58 to engage the surfaces of pockets 56 at different points. Since the surfaces of the pockets are formed on a curve, the cam characteristic will be varied in different positions of the rollers, the surfaces preferably being so designed as to compensate for the difference in angularity of the discs so that the traction pressure between the discs and rollers will be maintained substantially constant for a given load on the driven shaft. In the construction shown, the sleeve 44 and collar 52 will be closest together with the rollers in the position illustrated, and will be farthest apart when the rollers are in a line parallel to the driving shaft axis. Thus, with the rollers in this latter position, the cams will exert a greater axial force for a given load on the driven shaft and will exert a lesser axial force when the rollers are turned, thus to compensate for the increased mechanical advantage incident to the angular change through which the rollers transmit said axial force.

The rollers are supported on shafts 76 extending vertically through the housing and offset to place the center line of the rollers in alignment with the center line of the shaft bearings. The ends of the shafts 76 where they project through the housing 24 are rotatably supported in plates 78 which overlie the outer surfaces of the housing and are formed with flanges rotatably supporting the shafts and projecting through enlarged openings in the housings. The outer ends of the shafts are covered by cover plates 80 overlying the plates 78 and screws 82 extend through enlarged openings in the plates 78 and 80 and are screwed into the housing. By loosening the screws 82, the plates may be shifted laterally to adjust the positions of the shafts 76.

Figure 5:
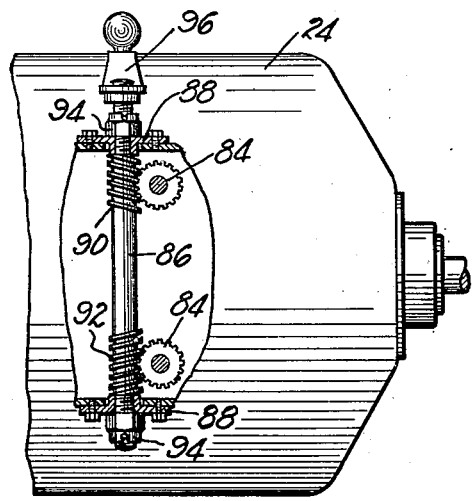
Figure 5 is a partial top plan view with parts broken away and in section.

Each of the shafts 76 adjacent the upper end of the casing carries a worm gear 84 meshing with a worm shaft 86, rotatably supported in the casing. As shown, the shaft 86 is supported by plates 88 similar to the plates 78, so that the position of the shaft can easily be adjusted. The worm shaft 86 is formed with toothed portions 90 and 92 meshing respectively with the worm gears 84, so that when the shaft is turned, the gears will be turned in opposite directions. The shaft is held against longitudinal movement by nuts 94 secured on the opposite end thereof, and is adapted to be rotated by a crank 96. It will be noted from Figure 5 that by adjusting the nuts 94, the shaft 86 may be adjusted longitudinally, turning the two worm gears 84 in the same direction during this adjustment. Since in normal operation these gears are turned in opposite directions by operation of the worms, it will be seen that longitudinal adjustment of the shaft as described effects an adjustment of the two rollers relative to each other.

Figure 6:
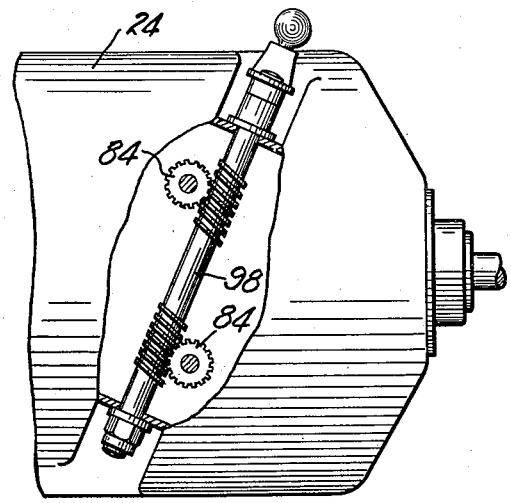
Figure 6 is a view similar to Figure 5, showing an alternative construction.

Figure 6 illustrates an alternative arrangement in which a worm shaft 98 extends at an angle across the casing so as to pass between the worm gears 84. The shaft 98 is formed with worm portions of like hand engaging the worm gears so that upon turning the shaft the gears will be turned in opposite directions. Since longitudinal adjustment of this shaft would result in the same movement of the worm gears as is effected by turning the shaft, no provision for longitudinal adjustment is made.

The present invention provides an extremely simple and inexpensive transmission in which a wide range of speed and torque ratios can be obtained by turning the rollers from one extreme position in which the disc 42 is driven slower than the disc 38, to another extreme position in which disc 42 is driven faster than disc 38. The transmission is extremely simple and inexpensive to manufacture, and will transmit relatively high torque loads with a high degree of efficiency. It is, therefore, extremely well suited to use in connection with power tools and the like, although it is to be understood that the invention is not limited to this use, nor otherwise than by the terms of the appended claims.

What is claimed is:

1. A transmission comprising a pair of identical discs of sheet material shaped to provide toroidal surfaces, means supporting said discs with the toroidal surfaces facing and with the centers of said surfaces spaced apart on a line parallel to the axis of the discs, a roller mounted between said discs engaging the toroidal surfaces thereof and with its center in alignment with the spaced centers of said toroidal surfaces, means for turning said roller about an axis at a right angle to its axis to change its points of engagement wtih the discs, turning of said roller causing one of the discs to move axially relative to the other, and cam means including relatively movable parts one of which is connected to said one of the discs to be moved axially with the disc, said cam means including cam surfaces having different cam angles in different axial positions to exert a different degree of force on said one of the discs in different axial positions thereof.

2. A transmission comprising a hollow driving shaft, a toroidal disc of sheet material secured to said driving shaft, a driven sleeve rotatable and slidable on the driving shaft, a toroidal disc substantially identical to the first named disc mounted on said sleeve, driving rollers between and drivably engaging said discs a bolt extending through the driving shaft, and bearing means rotatably connecting the sleeve and the bolt to urge the discs relatively together into engagement with the rollers.

3. A transmission comprising a hollow driving shaft, a toroidal disc of sheet material secured to said driving shaft, a driven sleeve rotatable and and slidable on the driving shaft, a toroidal disc substantially identical to the first named disc mounted on said sleeve, driving rollers between and drivably engaging said discs, cam means including a part rotatable relative to the shaft and sleeve and connected to a driven shaft, a bolt extending through the driving shaft and connected to said part to hold it against movement longitudinally thereof, and cooperating parts on said sleeve to urge the sleeve axially when said parts are turned relative to each other.

4. In a transmission of the traction type, a shaft, a hub portion on the shaft having an outwardly extending partially toroidal surface, and an annular disc of relatively thin sheet material and of arcuate section around the shaft with a portion of its convex side overlying and secured to the hub surface.

5. A transmission comprising a driving shaft, an annular flange on the driving shaft with one surface of concave arcuate section, an annular disc of relatively thin sheet material and of arcuate section around the shaft with its convex face overlying and secured to said surface, a driven sleeve rotatable on the driving shaft, an annular flange on the sleeve with one surface of concave arcuate section, an annular disc of relatively thin sheet material and of arcuate section around the driven sleeve with its convex face overlying and secured to said last named surface, driving rollers between and engaging the concave surfaces of the discs, and bearing means connected to the shaft and engaging the sleeve to hold the sleeve against outward movement on the shaft.

ADIEL Y. DODGE.